United States Patent [19]
Roth

[11] Patent Number: 5,013,072
[45] Date of Patent: May 7, 1991

[54] ARTICULATED TUBE CONNECTION, IN PARTICULAR FOR THE EXHAUST PIPEWORK OF A MOTOR VEHICLE

[75] Inventor: Robert Roth, Hericourt, France

[73] Assignee: ECIA-Equipements et Composants Pour L'Industrie Automobile, Audincourt, France

[21] Appl. No.: 443,266

[22] Filed: Nov. 29, 1989

[30] Foreign Application Priority Data

Dec. 27, 1988 [FR] France ............... 88 17234

[51] Int. Cl.⁵ ............................................. F16L 55/02
[52] U.S. Cl. ..................................... 285/233; 285/910
[58] Field of Search ............... 285/49, 233, 51, 910, 285/263, 261

[56] References Cited

U.S. PATENT DOCUMENTS

| | | | |
|---|---|---|---|
| 2,229,587 | 1/1941 | Parker | 285/233 |
| 2,431,120 | 11/1947 | Howe | 285/233 |
| 2,724,602 | 11/1955 | Carey et al. | 285/233 |
| 4,516,782 | 5/1985 | Usher | 285/910 |
| 4,548,415 | 10/1985 | Bendl | 285/910 |
| 4,659,117 | 4/1987 | Holzhausen et al. | 285/49 |
| 4,863,200 | 9/1989 | Brandener | 285/263 |
| 4,871,181 | 10/1989 | Usher et al. | 285/910 |
| 4,893,847 | 1/1990 | Hess | 285/910 |

FOREIGN PATENT DOCUMENTS 542208 12/1941 United Kingdom ............... 285/49

*Primary Examiner*—Eric K. Nicholson
*Attorney, Agent, or Firm*—Robert E. Burns; Emmanuel J. Lobato

[57] ABSTRACT

The connection has two inserted tubes, one of which, the outer tube (6), is enlarged in order to form a casing (8) for housing two support pads (10) which are held tightly between the two tubes and a radial projection (12) of the inner tube. A gasket (14, 15) with a section in the shape of a recumbent V and which has a cylindrical flange for bearing against the inner tube and a convex flange for bearing against the outer tube, is mounted on each of the ends of the casing (8). The two gaskets face in opposite directions and are fitted onto the pads which hold them tightly. The convex flange (18) is preferably spherical only for a part of its length. This spherical part forms the surface for rubbing against the casing and enables a relative displacement of these two members with no risk of the tightness failing.

11 Claims, 3 Drawing Sheets

ARTICULATED TUBE CONNECTION, IN PARTICULAR FOR THE EXHAUST PIPEWORK OF A MOTOR VEHICLE

BACKGROUND OF THE INVENTION

The present invention relates to the connection of two tubes, one of which experiences displacements and/or is subjected to vibrations, and more particularly the joint between an exhaust line and the manifold of a motor vehicle engine.

Members of this type usually joined by a connection having a gasket enclosed between two collars which are each integral with one of the tubes, one of the faces of the gasket acting as a sliding surface and having a convex shape which complements that of one of the collars. These systems do not, however, enable vibrations to be effectively damped and the tightness between the two tubes is usually faulty.

Articulated connections are also known which have, on the one hand, a tightness member, such as a gaiter seal etc., and, on the other hand, support and guiding means, mounted between the two tubes. The joint obtained is flexible and tight but the connection is complex, of a relatively large size and often insufficient to damp the vibrations.

SUMMARY OF THE INVENTION

The object of the present invention is to overcome these disadvantages by providing a particularly compact articulated connection which enables at once the required freedom of displacement, satisfactory filtering of vibrations and satisfactory tightness over a prolonged period of time to be obtained, with no risk of deterioration under temperature.

The subject of this invention is therefore an articulated tube connection having, between an inner tube having a radial projection and an outer tube, on the one hand tightness means and on the other hand support and damping means in contact with the projection, in which the outer tube has an enlarged part forming a casing, the end portions of which are substantially spherical, which rests on two annular support and damping pads and which is closed, at at least one of its ends by a gasket with a section in the shape of a recumbent-V, fitted onto the corresponding pad and bearing against each of the tubes.

Each gasket preferably has a cylindrical flange bearing against the inner tube and a convex flange in contact with the outer tube.

According to an alternative embodiment, the connection has two gaskets which each close one of the ends of the casing and their open sides consequently face each other.

The gap between the two tubes is thus closed tightly, whatever the relative displacements of the two tubes and the vibrations to which they are subjected. The casing and the gasket are in contact over a surface in the shape of a segment of a sphere which may be wider or narrower but enables in all cases a relative displacement of these two members without any dangerous wear of either of them or any risk of jamming being caused by rubbing.

BRIEF DESCRIPTION OF THE DRAWINGS

The description which follows of embodiments, given by way of non-limiting example and shown in the attached drawings, will, moreover, highlight the advantages and features of the invention. In these drawings.

DETAILED DESCRIPTION OF THE INVENTION

Figure 2:
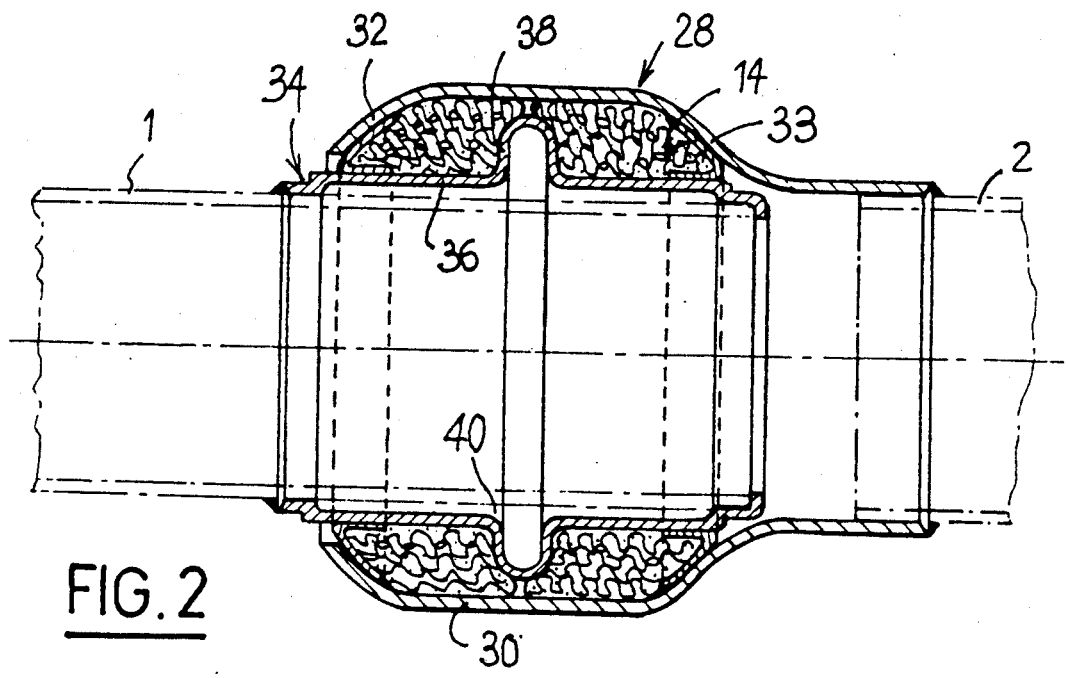
FIG. 2 is a view similar to FIG. 1 of an alternative embodiment.
Figure 1:
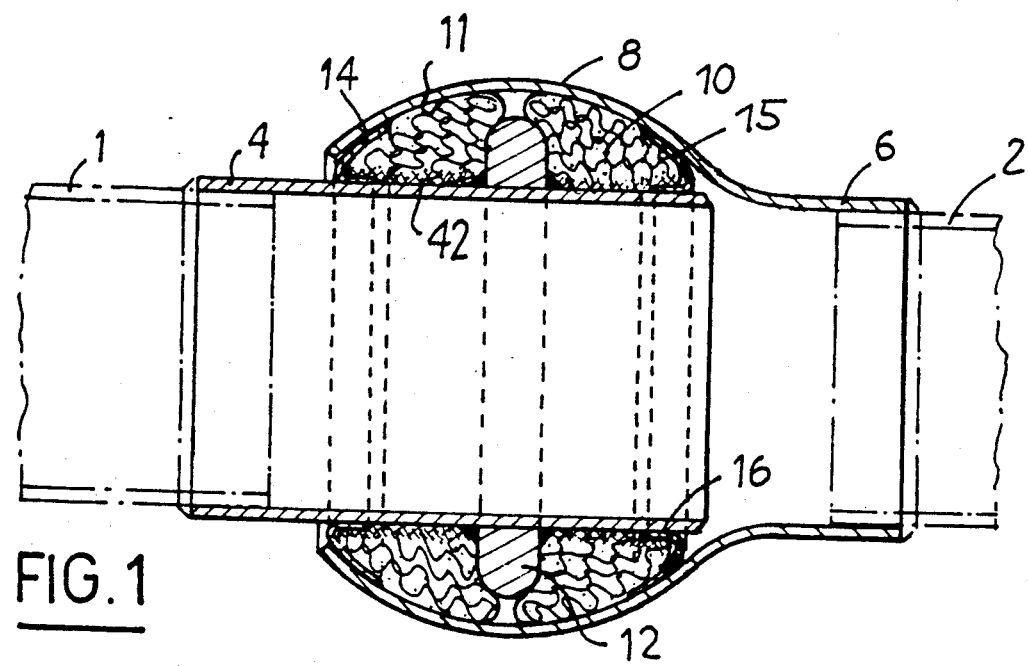
FIG. 1 is, a view in longitudinal section of a connection according to the invention.

The articulated connection shown is intended to be mounted between two tubes 1 and 2 which are indicated in dot-dashed lines in FIG. 1 and 2. The tube 1 is, for example, a tube connected to the exhaust manifold of a motor vehicle, whereas the tube 2 is either a conventional exhaust pipe or an exhaust pipe of the type in which an inner wall-like partition divides the pipe into two parallel ducts located side by side.

This connection has an inner tube 4 for connection to the manifold 1 and an outer tube 6 for connection to the exhaust line 2. The outer tube 6 has, at its free end, an enlarged part 8 which forms a casing and defines, with the tube 4, a housing for accommodating two support pads 10 surrounding the inner tube 4 and in close contact with the two tubes. These pads have a shape generated by rotation. They consist essentially of metal wires, preferably of a knitted material of metal wires. They may, however, also contain filling materials such as graphite, mica etc, in the region of their inner surface.

In the embodiment shown in FIG. 1, each of the pads 10 has an outer surface 11 which substantially has the shape of a spherical ring and this surface is applied against the inner face of the casing 8 which itself has a substantially spherical shape. As used herein, the term "spherical" means a surface having the shape of a portion of a sphere. The two pads 10 are, moreover, separated from each other by a ring 12 which forms a radial projection on the outer surface of the inner tube 4, is integrated with this tube, for example by welding, and forms a bearing surface for each of the pads.

Figure 6:
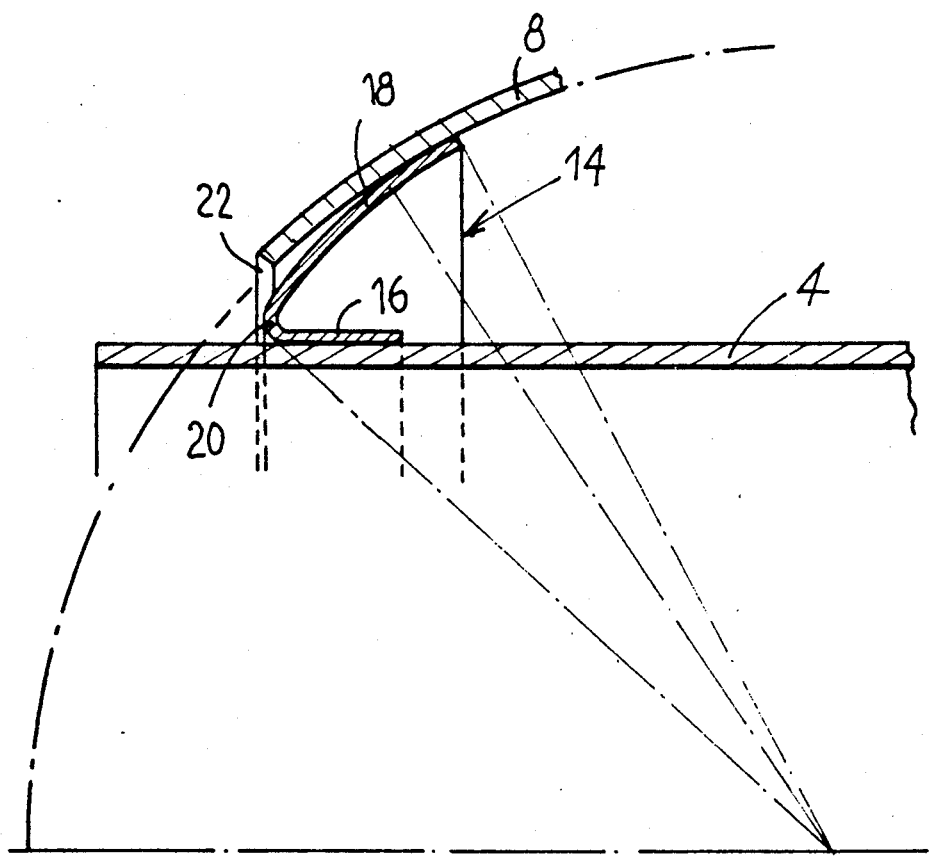
FIG. 6 is a diagrammatic view, on a larger scale, showing the position of the gasket relative to the tubes.

Each of the ends of the casing 8 is, in addition, closed by a gasket 14, 15 made of flexible metal which has a section in the shape of a recumbent-V. The gasket 14, 15 has, for this purpose, (FIG. 6) a cylindrical flange 16 which bears against the inner tube 4, and a convex flange, at least in part in the shape of a spherical ring 18, which is in contact with the spherical casing 8. These two flanges are connected together by a rounded vertex 20. The two flanges 16 and 18 diverge towards the projection 12, in other words towards the inside of the casing and each gasket 14, 15 is fitted onto the corresponding pad 10.

The convex flange 18 of the gasket 14, 15 is spherical over a part of its width, so that it is in rubbing contact with the casing 8 over a surface which corresponds substantially to a portion of a sphere. A gap is, however, provided between them at the end 22 of the casing 8, in other words in proximity to the rounded vertex 20 of the gasket. The latter is preferably produced from a steel sheet having a small thickness, for example less than 0.4 mm, in order to be sufficiently flexible to deform under the pressure of the pads 10, which are slightly compressed, and at all times to be held flat against the casing 8 and the tube 4 without being locked.

The gasket 14, 15 thus ensures an absolutely tight closing of the corresponding end of the casing 8 and prohibits the passage of gas between the inner tube 4 and this casing. It also enables the relative displacement of these two members, since the contact surface between it and the casing 8 is a portion of a sphere; there is no fear of possible jamming or loss of tightness. This is because the pads 10 ensure not only the support of the part downstream from the exhaust line 2 and the holding of the gasket 14, 15 tightly against the casing, but also the filtering of vibrations.

Although the connection has a gasket 14, 15 at each of the ends of the casing in the embodiment shown, it will be clear that, when the desired level of tightness permits it, the connection may employ only one gasket 15 which is inserted between the pads 10 and the hot gases circulating between the pipes 1 and 2 through the inner tube 4.

According to an alternative embodiment, the spherical casing 8 is replaced by a casing 28 having a cylindrical central part 30 between two spherical rings 32 and 33, each bearing against a gasket 14, 15. A casing of this type has the advantage of being smaller in size than the spherical casing 8. In addition, during relative displacements of the two tubes 4 and 6, it alternatively compresses and stretches the pads 10, which enables the bending stiffness of the connection to be increased for relatively substantial deflections, whilst at the same time preserving its flexibility for minor deflections.

This casing 28 may be combined, in the same way as the spherical casing 8, with an inner tube 4 integral with an attached ring 12. It may also, as shown in FIG. 2, be combined with an inner tube 4 having an enlarged portion 36 in which an outward-projecting undulation 38 is formed. The pads 10 then bear against the opposite sides of this projection. An inner tube 34 of this type is preferably attached to the pipe 1 to be connected and fastened onto it at its two ends. An enclosed cavity 40 is thus provided between the inner tube 34 and the pipe 1. It creates a heat screen between the hot gases passing in the tube and the pads 10 which should be protected from excessive temperatures. The pipe 1 acts as a fire shield.

Protection of the pads 10 may, furthermore, be increased by arranging on the cylindrical surface of these pads, which is in contact with the inner tube 4, a layer of compact material 42 (FIG. 1), for example graphite or mica, which makes exchanges of heat in the direction hot gases-pads 10 more difficult. It can be seen, moreover, that this layer 42 improves the tightness between the cylindrical flange 16 of the gasket 14, 15 and the inner tube 4.

Figure 3:
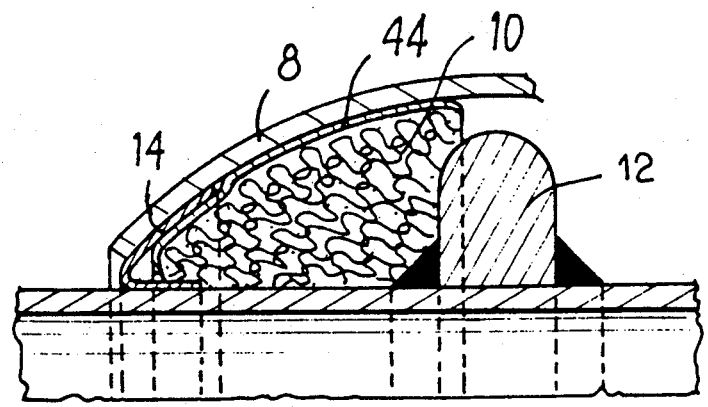
FIGS. 3, 4 and 5 are partial views, in longitudinal section other alternative embodiments of the invention.

According to another alternative embodiment, a thin metal foil 44 is arranged on the curved outer surface of the pad 10, as shown in FIG. 3. This metal foil 44 covers at least the part of the pad 10 which is intended to be in contact with the flange 18 of the gasket but may, as shown, cover the entire outer surface of this pad. Any danger of the pad metal wires escaping between the metal gasket 14, 15 and the casing 8 is thus prevented.

Figure 4:
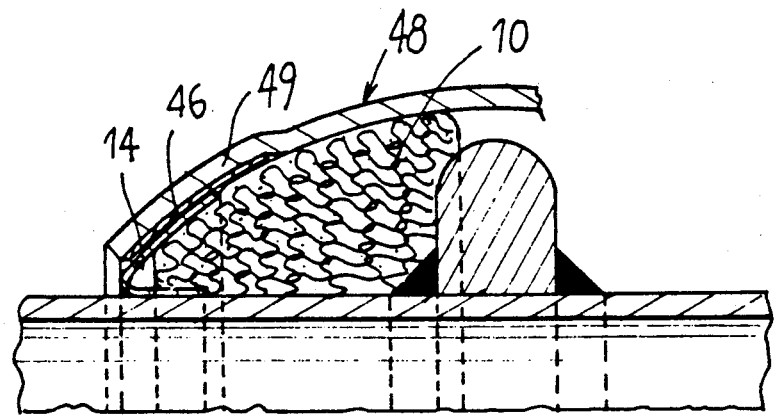

According to another alternative (FIG. 4), the casing 48 is covered on the inside, at least in its spherical part, by a metal sheet 46 which forms the rubbing zone on the convex flange 18 of the gasket 14 and thus limits transmission of noises to the exhaust pipework. The end part 49 of the casing 48 is preferably, as shown, slightly deformed outwards so as to establish a recess for accommodating the metal sheet 46 and to enable the inner face of the latter to be situated exactly in the extension of the inner face of the remainder of the casing.

Figure 5:
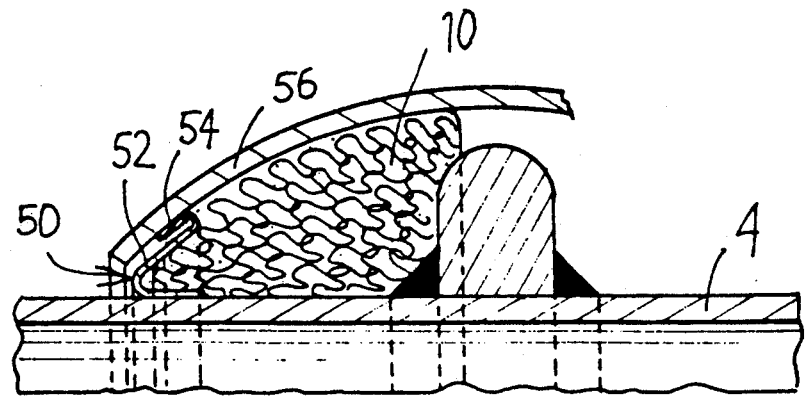

According to another alternative embodiment, as shown in FIG. 5, the connection has at least one gasket 50, the outer convex flange 52 of which at its free end is bent back in a U-shape towards the outside. The gasket 50 thus has an annular rim 54 bearing against the spherical end of a casing 8, 28 or 48. The rim 54 is in contact with this spherical part 56 over an extremely narrow surface. This arrangement is particularly advantageous in cases where there is a danger of various impurities being deposited on the rubbing surface and disrupting the operation of the connection. As a result of the particular shape of the gasket, the impurities are expelled naturally when the connection oscillates. In all cases, the contact between the rim 54 and the casing is sufficiently narrow to ensure tightness of the gap between the inner tube and the outer tube.

Whatever its embodiment, the connection obtained is compact and effectively ensures at once the functions of tightness, filtering of the vibrations and support of the exhaust line. The casing may be formed from several components, which facilitates assembly and installation around the pads. It may, of course, also be a single component. The spherical shape of its free end is then obtained by crimping, after the pads and the gasket have been installed around the inner tube.

I claim:

1. A connector for making an articulated fluid tight connection between two pipes, said connector comprising,
   a cylindrical inner member joined with one of said pipes and having a radially projecting annular rib disposed intermediate its ends,
   two annular pads surrounding said cylindrical inner member and disposed respectively on opposite sides of said annular rib,
   an outer member comprising a cylindrical portion joined with the other of said two pipes and an integral enlarged portion forming an annular casing encasing said two annular pads an said annular rib, said casing being smoothly curved in axial section and having end portions encompassing said inner member with small gaps between said end portions of said casing and said inner member, and
   gasket means for forming a fluid right seal between said casing and said inner member at at least on end of said casing,
   said inner member, annular rib, annular pads, outer member and gasket means forming an articulated, fluid tight connection between said two pipes and constituting the sole connection between said two pipes.

2. A connector according to claim 1, in which said gasket means comprising a thin, sheet metal gasket of Vshape cross section with a cylindrical flange engaging said inner member and a convex flange engaging an inner surface of said casing.

3. A connector according to claim 1, in which said gasket means is provided at both ends of said casing.

4. A connector according two claim 1, in which said casing has a shape of a portion of a sphere.

5. A connector according to claim 1, in which said casing has a cylindrical median portion and opposite end portions each having a shape of a portion of a sphere.

6. A connector according to claim 1, in which said annular pads are composed of metal wire, each of said pads having a cylindrical inner face covered by a layer of compact material bearing on said inner member.

7. A connector according to claim 2, further comprising thin metal foil interposed between said annular pad and said sheet metal gasket.

8. A connector according to claim 2, further comprising thin metal sheet material interposed between said outer member and said sheet metal gasket.

9. A connector according to claim 2, in which an edge portion of said convex flange of said gasket is bent outwardly and back on itself to form a rim of U-shaped cross section having a narrow surface bearing on an inner surface of said casing.

10. A connector according to claim 1, in which said radially projecting annular rib comprised a ring surrounding and welded on said inner member.

11. A connector according to claim 1, in which said radially projecting annular rib comprises an annular rib comprises an annular outwardly projecting undulation in said inner member forming an annular cavity in said inner member.

* * * * *